(12) United States Patent
Shen et al.

(10) Patent No.: US 8,782,352 B2
(45) Date of Patent: Jul. 15, 2014

(54) SYSTEM AND METHOD FOR SUPPORTING A SELF-TUNING LOCKING MECHANISM IN A TRANSACTIONAL MIDDLEWARE MACHINE ENVIRONMENT

(75) Inventors: Xugang Shen, Beijing (CN); Xiangdong Li, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 165 days.

(21) Appl. No.: 13/414,593

(22) Filed: Mar. 7, 2012

(65) Prior Publication Data

US 2013/0086333 A1    Apr. 4, 2013

Related U.S. Application Data

(60) Provisional application No. 61/541,051, filed on Sep. 29, 2011.

(51) Int. Cl.
*G06F 12/12* (2006.01)
*G06F 9/52* (2006.01)

(52) U.S. Cl.
CPC ..................... *G06F 9/526* (2013.01)
USPC ........... 711/152; 711/163; 711/164; 711/170; 711/171; 380/264

(58) Field of Classification Search
USPC ........... 711/152, 163, 164, 170, 171; 380/264
See application file for complete search history.

(56) References Cited

U.S. PATENT DOCUMENTS

| 5,050,072 | A | 9/1991 | Earnshaw et al. | |
| 6,018,788 | A * | 1/2000 | Ichikawa | 711/113 |
| 6,199,162 | B1 * | 3/2001 | Luyster | 713/168 |
| 6,549,961 | B1 | 4/2003 | Kloth | |
| 7,594,234 | B1 | 9/2009 | Dice | |
| 7,747,805 | B2 | 6/2010 | McKenney | |
| 2001/0003200 | A1 * | 6/2001 | Utsumi | 711/201 |
| 2001/0033654 | A1 * | 10/2001 | Wieser | 380/28 |
| 2005/0018842 | A1 * | 1/2005 | Fu et al. | 380/44 |
| 2006/0143511 | A1 | 6/2006 | Huemiller | |
| 2007/0239943 | A1 | 10/2007 | Dice et al. | |

OTHER PUBLICATIONS

International Search Report and Written Opinion dated Dec. 6, 2012, International Application No. PCT/US2012/055942, 7 pages.

\* cited by examiner

*Primary Examiner* — Jae Yu
(74) *Attorney, Agent, or Firm* — Meyer IP Law Group

(57) ABSTRACT

A lock mechanism can be supported in a transactional middleware system to protect transaction data in a shared memory when there are concurrent transactions. The transactional middleware machine environment comprises a semaphore provided by an operating system running on a plurality of processors. The plurality of processors operates to access data in the shared memory. The transactional middleware machine environment also comprises a test-and-set (TAS) assembly component that is associated with one or more processes. Each said process operates to use the TAS assembly component to perform one or more TAS operations in order to obtain a lock for data in the shared memory. Additionally, a process operates to be blocked on the semaphore and waits for a release of a lock on data in the shared memory, after the TAS component has performed a number of TAS operations and failed to obtain the lock.

14 Claims, 2 Drawing Sheets

SYSTEM AND METHOD FOR SUPPORTING A SELF-TUNING LOCKING MECHANISM IN A TRANSACTIONAL MIDDLEWARE MACHINE ENVIRONMENT

CLAIM OF PRIORITY

This application claims the benefit of priority on U.S. Provisional Patent Application No. 61/541,051, entitled "SYSTEM AND METHOD FOR SUPPORTING A SELF-TUNING LOCKING MECHANISM IN A TRANSACTIONAL MIDDLEWARE MACHINE ENVIRONMENT" filed Sep. 29, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a transactional middleware machine environment.

BACKGROUND

A transactional middleware system, or a transaction oriented middleware, includes enterprise application servers that can process various transactions within an organization. With the developments in new technologies such as high performance network and multiprocessor computers, there is a need to further improve the performance of the transactional middleware. These are the generally areas that embodiments of the invention are intended to address.

SUMMARY

Described herein is a lock mechanism that can be supported in a transactional middleware system for protecting transaction data in a shared memory when there are concurrent transactions. The transactional middleware machine environment includes an operating system running on a plurality of processors, each of which operates to access data in a shared memory. The transactional middleware machine environment also comprises a semaphore that is provided by the operating system, and a test-and-set (TAS) assembly component that is associated with one or more processes. Each process can use the TAS assembly component to perform one or more TAS operations in order to obtain a lock for data in the shared memory. Furthermore, a process can block the semaphore and wait for a release of a lock on data in the shared memory, after the TAS component has failed to obtain the lock after performing a specified number of TAS operations.

DETAILED DESCRIPTION

Figure 1:
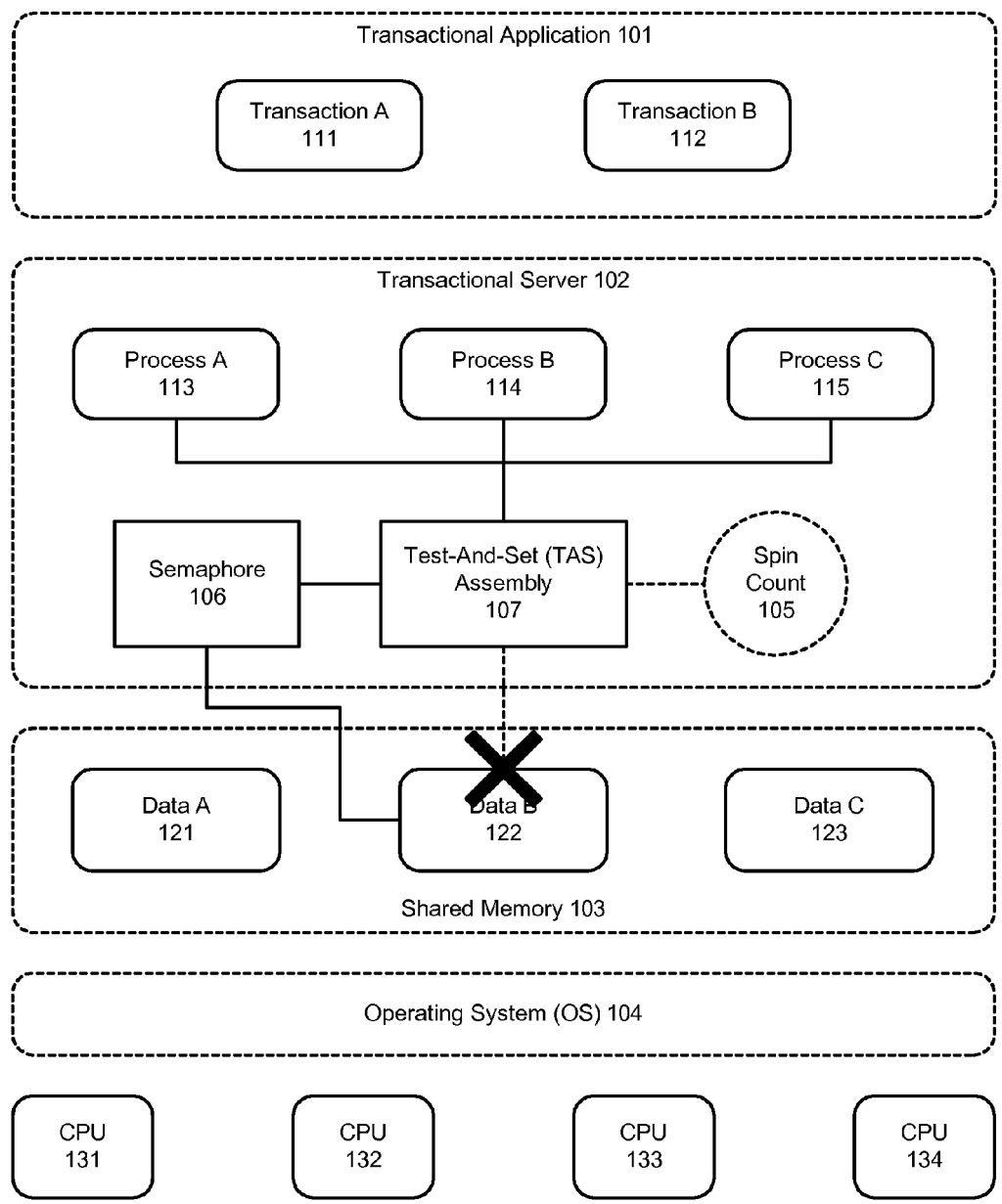
FIG. 1 shows an illustration of a transactional middleware machine environment that supports a self-tuning lock mechanism, in accordance with an embodiment of the invention.

Described herein is a system and method for supporting a transactional middleware system, such as Tuxedo, that can take advantage of fast machines with multiple processors, and a high performance network connection. A lock mechanism can be supported in a transactional middleware system to protect transaction data in a shared memory when there are concurrent transactions. The transactional middleware machine environment comprises a semaphore provided by an operating system running on a plurality of processors. The plurality of processors can access data in the shared memory. The transactional middleware machine environment also comprises a test-and-set (TAS) assembly component that is associated with one or more processes. Each said process operates to use the TAS assembly component to perform one or more TAS operations in order to obtain a lock for data in the shared memory. Additionally, a process operates to be blocked on the semaphore and wait for a release of a lock on data in the shared memory, after the TAS component has performed a number of TAS operations and failed to obtain the lock.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, Tuxedo is a set of software modules that enables the construction, execution, and administration of high performance, distributed business applications and has been used as transactional middleware by a number of multi-tier application development tools. Tuxedo is a middleware platform that can be used to manage distributed transaction processing in distributed computing environments. It is a proven platform for unlocking enterprise legacy applications and extending them to a services oriented architecture, while delivering unlimited scalability and standards-based interoperability.

In accordance with an embodiment of the invention, a transactional middleware system, such as a Tuxedo system, can take advantage of fast machines with multiple processors, such as an Exalogic middleware machine, and a high performance network connection, such as an Infiniband (IB) network.

A Self-Tuning Lock Mechanism

In accordance with an embodiment of the invention, a self-tuning lock mechanism can be supported in a transactional middleware system to protect transaction data in a shared memory when there are concurrent transactions. Using the self-tuning lock mechanism, the transactional middleware machine environment can achieve significant throughput improvement in transactional application scenarios such as applications with massive concurrent transactions.

FIG. 1 shows an illustration of a transactional middleware machine environment that supports a self-tuning lock mechanism, in accordance with an embodiment of the invention. As shown in FIG. 1, a transactional middleware machine comprises multiple CPUs 131-134 that support an operating system (OS) 104, and a shared memory 103 that includes various transactional data 121-123. A transactional application 101 with multiple concurrent transactions 111-112 can run on a plurality of processes 113-115 in a transactional server 102, each of which can use an atomic TAS (Test-And-Set) assembly 107 to implement an effective locking mechanism. The locking mechanism can protect the transaction data in the shared memory when there are concurrent transactions. In addition, a process in the transactional application can use a semaphore mechanism 106 provided by the OS to obtain a lock on data 122 if necessary.

In accordance with one embodiment, when a process 111 wants to get a lock on data 122, the process can perform a TAS operation for a number of rounds. The system can specify a target spin count, which is the number of rounds of TAS operation that are allowed. The target spin count can be either preconfigured or dynamically determined.

If the lock becomes available before the target spin count is reached, the process can obtain the lock with much less cost than the semaphore mechanism provided by the OS. On the other hand, if the lock is not available during this period, then the process can be configured to block the semaphore, and wait until the lock owner wakes up and releases the lock.

In accordance with an embodiment of the invention, the target spin count value can be decided in the context of the hardware configuration and the application scenario. Users can fine tune the spin count value manually in order to find an optimized value. The decision may not be obvious in some situations, since there is a trade-off between the CPU usage and the time to get a lock. For example, users may have to spend more CPU power to perform more TAS operations in order to get the lock in a shorter time frame. Hence, there may not be an optimized target spin count value that is obvious for every case.

One drawback of user level semaphore implementation is that the transactional application may not be able to dynamically adjust the target spin count in real time depending on the specific machine type. In general, the user level semaphore only uses a statically configured target spin count value, and users can adjust the target spin count value manually only by experimental practices. Since the optimal spin count value is machine dependent, and there is no one-fit-in-all value for all platforms, a more suitable approach is to employ a mechanism to calculate the target spin count value dynamically and in real time.

In accordance with an embodiment of the invention, the target spin count value can be stored in a shared memory. A special process, such as a Tuxedo daemon process, can periodically change the spin count value according to operation information collected in the previous period. For example, the Tuxedo daemon can update the target spin count value once per 5 seconds by default.

In accordance with one embodiment, an algorithm can be used to configure the target spin count value. The algorithm can increase the target spin count value, if the CPU idle ratio is low, or too many TAS operations have failed to obtain the lock and the system switched to the semaphore. Furthermore, the algorithm can decrease the target spin count value if the CPU idle ratio is too high.

Figure 2:
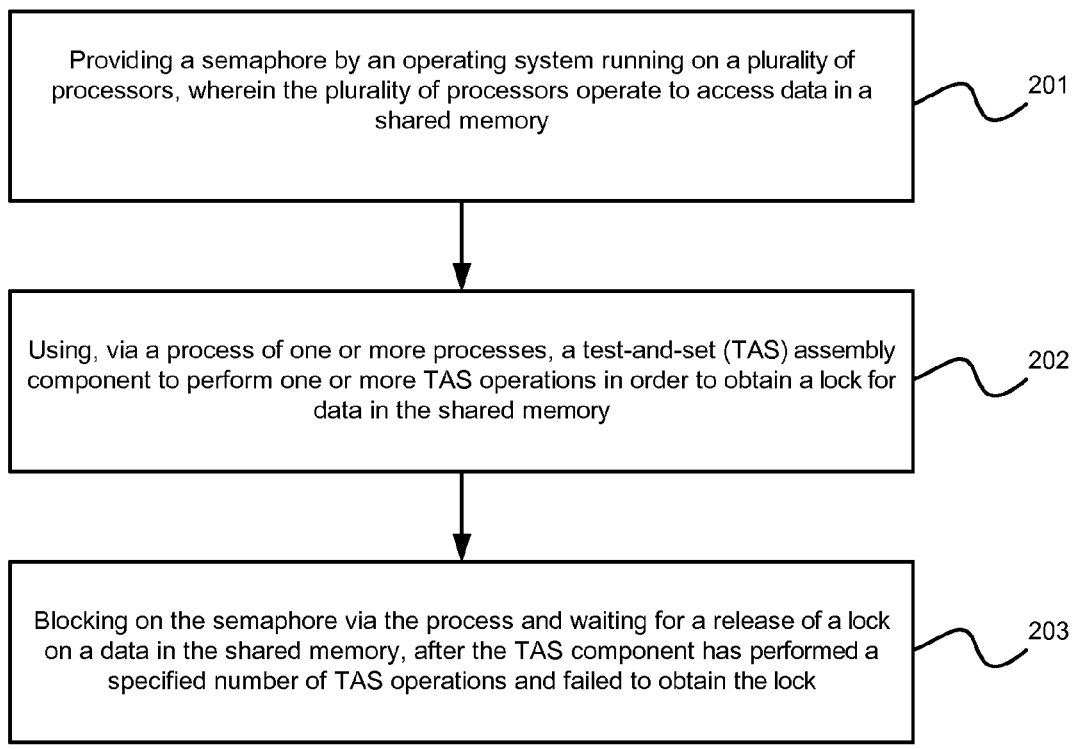
FIG. 2 illustrates an exemplary flow chart for supporting a self-tuning lock mechanism in a transactional middleware machine environment, in accordance with an embodiment of the invention.

FIG. 2 illustrates an exemplary flow chart for supporting a self-tuning lock mechanism in a transactional middleware machine environment, in accordance with an embodiment of the invention. As shown in FIG. 2, at step 201, the system can provide a semaphore associated with an operating system running on a plurality of processors, wherein the plurality of processors operate to access data in a shared memory. Then, at step 202, a process of one or more processes can use a test-and-set (TAS) assembly component to perform one or more TAS operations in order to obtain a lock for data in the shared memory. Finally, at step 203, the process can be blocked on the semaphore and wait for a release of a lock on data in the shared memory, after the TAS component has performed a specified number of TAS operations and failed to obtain the lock.

Configuring the SPINCOUNT Value in Tuxedo

In accordance with an embodiment of the invention, metadata, such as a SPINCOUNT parameter in the Tuxedo configuration file, can be used to specify the target spin count. SPINCOUNT can be either a static configured value, or a dynamic one.

For example, Tuxedo can use a statically set value of SPINCOUNT to determine how many times the bulletin board lock waits are spinning before getting blocked on system level semaphore. The drawback of this algorithm is that the value set by user is not the optimal value of SPINCOUNT on the specific platform, because the optimal value of SPINCOUNT is dependent upon many dynamic factors such as the CPU amounts, workload, number of waits for the Bulletin Board (BB) lock etc.

Additionally, Tuxedo can dynamically tune the value of SPINCOUNT while taking the runtime environment into consideration. An algorithm can be used to determine an appropriate value for the SPINCOUNT parameter. The system can increase the SPINCOUNT, if too many TAS operations have failed in the previous period and the system switched to the semaphore, and there was an enough CPU idle ratio. On the other hand, the system can decrease the SPINCOUNT, if the CPU idle ratio was too high.

The above algorithm is based on the CPU usage, e.g. CPU idle rate, and the ratio of SPIN failure, e.g. a ratio of SPIN failure in every 10000 operations to obtain a lock. The ratio of SPIN failure can indicate how many times locks are obtained via the semaphore instead of via the TAS operation.

A process can be in a SPIN mode, when the process is in an active status. The process can be blocked on the semaphore, if the process fails to obtain the lock after trying to perform the TAS operations for a number of times, which is referred to as a SPIN failure. The process can try to perform a TAS operation again and again in order to get the lock before a SPIN failure happens. A configurable parameter, e.g. SPINCOUNT, can be used to specify the number of rounds of TAS operation to be invoked and performed.

In accordance with an embodiment of the invention, the minimum idle CPU rate and the SPIN failed rate can be defined using metadata in a configuration file. For example, in the Tuxedo configuration file, there can be a MINIDLECPU parameter for defining the minimum idle CPU rate, the value of which has a range of 1-100 with 20 as default. Additionally, there can be a FACTOR parameter for defining the SPIN failed rate, the value of which has a range of 1-10000 with 1000 as default.

When a minimum idle CPU rate and SPIN failed rate are given, the system can tune the SPINCOUNT in each scan unit. Then, the system can increase the SPINCOUNT if the SPIN failure rate is too high (e.g. the SPIN failure rate is set to be greater than (1/FACTOR*1.1)), or the idle CPU time is enough (e.g., idle rate>MINIDLECPU %+0.05), with the new SPINCOUNT=old SPINCOUNT+old SPINCOUNT*(cpu_idletime/cpu_usertime) and the maximum SPINCOUNT can to be set as 10,000,000. Otherwise, the system can decrease the SPINCOUNT when the idle CPU ratio is too low (e.g., idle rate<MINIDLECPU %−0.05), with the new SPINCOUNT=old SPINCOUNT/4 and the minimum SPINCOUNT to be set as 50000.

The following Listing 1 is a Tuxedo example for SPINTUNING configuration.

ING_MINIDLECPU" that is used for specifying idle CPU rate. The idle CPU rate can be used by the system to find a proper SPINCOUNT dynamically. The larger SPINCOUNT is, the more CPU that the system uses. User can set the minimum idle CPU rate via "SPINTUNING_MINIDLECPU" to avoid spending too much CPU.

The value of "SPINTUNING_MINIDLECPU" is numeric and in percentages. It can be greater than or equal to "0" and less than or equal to "100". A value of 0 indicates that the value built into the delivered binary should be used. For example, in Tuxedo, the built-in value can be set as 20, and the default value of "SPINTUNING_MINIDLECPU" is 0. The attribute can be set with a nonzero value only if the option SPINTUNING is specified.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

Listing 1

```
*RESOURCES
IPCKEY          123456
DOMAINID        simpapp
MASTER          ALLEN
MAXACCESSERS    10
MAXSERVERS      5
MAXSERVICES     10
MODEL             SHM
LDBAL           N
OPTIONS           EXALOGIC,SPINTUNING
*MACHINES
ALLENHOST       LMID="ALLEN"
APPDIR="/home/allen/Workspace/Tuxedo11gR1PS2/simpdir"
TUXCONFIG="/home/allen/Workspace/Tuxedo11gR1PS2/simpdir/tuxconfig"
TUXDIR="/home/allen/Software/OraHome/tuxedo11gR1PS2"
SPINTUNING_TARGET=1000
SPINTUNING_MINIDLECPU=20
*GROUPS
GROUP1
LMID=ALLEN GRPNO=1 OPENINFO=NONE
*SERVERS
DEFAULT:
CLOPT="-A"
simpserv SRVGRP=GROUP1 SRVID=1
*SERVICES
TOUPPER
```

As shown in the above example, the *MACHINES section of the configuration file includes an attribute "SPINTUNING_TARGET" that is used for configure tuning target. The value of "SPINTUNING_TARGET" is numeric, which can be greater than or equal to "0" and less than or equal to e.g. "10000". A value of 0 indicates that the value built into the binary is used. The built-in value is 1000. The default value of "SPINTUNING_TARGET" is 0.

In the above example, the value of SPINTUNING_TARGET means that there is at most one time for the bulletin board to be locked via system semaphore per every thousand locks. The system can increase the value of SPINCOUNT with more CPU spent to meet a larger value of SPINTUNING_TARGET. The attribute can be set with a nonzero value only if the option SPINTUNING is specified.

As shown in the above example, the *MACHINES section of the configuration file includes an attribute "SPINTUN- In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting a locking mechanism in a transactional middleware machine environment, comprising:
   a semaphore provided by an operating system running on a plurality of processors, wherein the plurality of processors operate to access data in a shared memory;
   a test-and-set (TAS) assembly component that is associated with one or more processes, wherein each said process operates to use the TAS assembly component to perform one or more TAS operations in order to obtain a lock for data in the shared memory, wherein a process operates to be blocked on the semaphore and waits for a release of a lock on data in the shared memory, after the TAS component has performed a specified number of TAS operations and failed to obtain the lock wherein the lock mechanism uses a spin count, which is the specified number of maximum rounds of TAS operations allowed, wherein the spin count is periodically determined using a special process, wherein the spin count is dynamically determined using an algorithm, wherein the algorithm specifies that the spin count is increased from the spin count of a previous period, if a number of spin failures in the previous period exceeds a spin failure limit and a CPU idle ratio in the previous period is below a CPU idle ratio limit, and the spin count is decreased from the spin count of a previous period, if the CPU idle ratio exceeds a CPU idle ratio limit.

2. The system of claim 1, wherein the lock mechanism protects transaction data in the shared memory when there are multiple concurrent transactions.

3. The system of claim 1, wherein the spin count is preconfigured in metadata.

4. The system of claim 1, wherein the spin count is dynamically determined based on both a hardware configuration and an application scenario.

5. The system of claim 1, wherein a spin failure happens when a process fails to obtain a lock on data after attempting the TAS operation for a specified number of times.

6. The system of claim 1, wherein, using the semaphore, the process operates to obtain the lock when a lock owner wakes up and releases the lock.

7. The system of claim 1, wherein the spin count is fine tuned manually to find an optimized value.

8. A method for supporting a locking mechanism in a transactional middleware machine environment, comprising:
   providing a semaphore associated with an operating system running on a plurality of processors, wherein the plurality of processors operate to access data in a shared memory;
   using, via a process of one or more processes, a test-and-set (TAS) assembly component to perform one or more TAS operations in order to obtain a lock for data in the shared memory;
   blocking on the semaphore via the process and waiting for a release of a lock on data in the shared memory, after the TAS component has performed a specified number of TAS operations and failed to obtain the lock, wherein the lock mechanism uses a spin count, which is the specified number of maximum rounds of TAS operations allowed, wherein the spin count is periodically determined using a special process, wherein the spin count is dynamically determined using an algorithm, wherein the algorithm specifies that the spin count is increased from the spin count of a previous period, if a number of spin failures in the previous period exceeds a spin failure limit and a CPU idle ratio in the previous period is below a CPU idle ratio limit, and the spin count is decreased from the spin count of a previous period, if the CPU idle ratio exceeds a CPU idle ratio limit.

9. The method of claim 8, further comprising protecting transaction data in the shared memory when there are multiple concurrent transactions.

10. The method of claim 8, further comprising preconfiguring the spin count in metadata.

11. The method of claim 8, further comprising dynamically determining the spin count based on both a hardware configuration and an application scenario.

12. The method of claim 8, wherein a spin failure happens when a process fails to obtain a lock on data after attempting the TAS operation for a specified number of times.

13. The method of claim 8, further comprising using the semaphore to obtain the lock when a lock owner wakes up and releases the lock.

14. The method of claim 8, further comprising fine tuning the spin count manually to find an optimized value.

* * * * *